United States Patent [19]

Wagner et al.

[11] 3,892,877

[45] July 1, 1975

[54] PROCESS FOR PREPARING TOMATO JUICE OF INCREASED CONSISTENCY

[75] Inventors: Joseph R. Wagner, Moraga; Jackson C. Miers, Pleasant Hill; Robert Becker, Lafayette, all of Calif.

[73] Assignee: The United States of America as represented by the Secretary of Agriculture, Washington, D.C.

[22] Filed: Mar. 17, 1972

[21] Appl. No.: 235,779

[52] U.S. Cl. ............... 426/365; 426/373; 426/489; 426/510; 426/241; 426/519
[51] Int. Cl.................................................. A23l 1/02
[58] Field of Search ............ 99/105, 106, 154, 156; 426/365, 370, 372, 373, 489, 510, 519, 241

[56] References Cited
UNITED STATES PATENTS

| | | | |
|---|---|---|---|
| 3,366,488 | 1/1968 | Wagner et al. | 99/105 |
| 3,366,489 | 1/1968 | Wagner et al. | 99/105 |
| 3,366,490 | 1/1968 | Wagner et al. | 99/105 |

OTHER PUBLICATIONS
Food Technology, Vol. XI, No. 1, pp. 19–22, 1957, Whittenberger & Nutting, "Effect on Tomato Cell Structure on Consistency of Tomato Juice."

*Primary Examiner*—Norman Yudkoff
*Assistant Examiner*—Martin G. Mullen
*Attorney, Agent, or Firm*—M. Howard Silverstein; Max D. Hensley; William Takacs

[57] ABSTRACT

Process for preparing tomato juice of high consistency which has the feature that consistency is not developend until a late stage in the total process, whereby to obtain savings in power consumption and other advantages. Example: Raw tomatoes are macerated and heated, the macerate is acidified, and juice extracted from the acidified macerate, all these steps being done under conditions which avoid damage to individual fruit cells. Then, the juice is homogenized by applying vigorous and repeated shearing action to cause extensive damage to the fruit cells and thereby increase the consistency of the juice.

11 Claims, No Drawings

PROCESS FOR PREPARING TOMATO JUICE OF INCREASED CONSISTENCY

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

The invention relates to and has among its objects the provision of novel processes for preparing tomato products, such as juices and concentrates, of increased consistency. Further objects of the invention will be evident from the following description wherein parts and percentages are by weight unless otherwise specified. The verb "macerate" is employed herein—in common with its usage in the art—to denote application of mechanical action as in breaking up and subdividing tomatoes into a pulpy mass.

It is recognized in the industry that consistency is an important attribute of tomato juice. In particular, higher consistency represents better quality. It is to be especially noted that consistency has no fixed relationship with solids contents so that whereas two lots of tomato juice prepared by different procedures and/or different raw materials may have identical solids contents, their consistencies may be radically different. The matter of consistency is not only important with regard to tomato juice per se but also with regard to products prepared therefrom such as concentrated juice, pastes, sauces, ketchups, etc. In all these products a higher consistency signifies better quality and to attain such quality it is necessary that the juice employed as the starting material be of high consistency.

In the patents of Joseph R. Wagner et al., U.S. Pat. Nos. 3,366,488, 3,366,489, and 3,366,490 there are disclosed procedures for preparing high-consistency tomato juices. These procedures have the common denominator that high consistency is developed early in the operations. For instance, as described in '488, raw tomatoes are subjected to maceration and heating. Hydrochloric acid is then incorporated into the hot macerate under such conditions that the consistency of the macerate is increased. In the processes of '489 and '490 the acid treatment is applied as the raw tomatoes are being macerated and heated, again with the result that a macerate of increased consistency is formed.

It is to be noted that in all three of the patented techniques, consistency increase is realized at an early stage in the process, that is, at the time of acidification or shortly thereafter. On the other hand, the basic concept of the present invention is to avoid this early development of consistency; instead, consistency increase is delayed until a later stage in the total process. This desirable result is obtained by minimizing mechanical damage to the fruit cells during the early stages of the process (whereby to maintain low consistency) and then subjecting the tomato material to vigorous shear forces at the stage in the proceeding when it is desired to realize the consistency increase.

A typical embodiment of the invention involves the following steps:

1. Raw tomatoes are macerated and heated to inactivate the enzymes. The maceration is accomplished with enough mechanical action to break up the tomatoes into a pulpy mass, but with minimum damage to individual fruit cells.

2. The hot macerate is treated with acid, this step being accomplished with minimum damage to individual fruit cells whereby to avoid consistency increase.

3. The hot acidified macerate is treated (or "pulped" as it usually is termed in the industry) to extract the juice from the seeds, skins, and other debris. In this step precautions are taken to minimize damage to individual fruit cells whereby to avoid consistency increase.

4. The juice separated from the acid-treated macerate is neutralized to its natural pH. Here again conditions are regulated so as to minimize damage to individual fruit cells whereby to avoid consistency increase.

5. The neutralized juice is then homogenized (subjected to vigorous and repeating shearing forces) whereby the consistency is increased.

It is to be emphasized that (Steps 1 through 4) must be accomplished with minimum mechanical damage to individual fruit cells in those cases where it is desired to avoid any substantial increase in consistency until application of (Step 5).

One advantage of the invention lies in decreased power consumption. Increased consistency gives rise to increased resistance to performing operations such as mixing, pulping, and transfer of tomato materials through pipes and pumps. In the present process the increase in consistency is delayed until application of the homogenizing step whereby the power required for macerating, pulping, mixing, etc. is less than in the known procedures wherein consistency is developed early in the sequence of operations.

Another advantage of the invention is that by maintaining low consistency during the pulping operation a better yield is attained; that is, of the total tomato solids being handled, a greater proportion thereof will be recovered in the juice. Conversely, one may say that the seeds, skins, and other debris formed in the pulping step will represent a lesser proportion of the total tomato solids entering the operation.

Another advantage of the invention is its flexibility in that the operator now has the option of realizing the consistency increase at such time when he desires it or when it is most advantageous. Since the development of high consistency is divorced from the early stages, the operator can put off development of consistency until it is convenient to do so and he can even transfer the juice to a different location or plant where it may be then homogenized to develop consistency.

A further advantage of the invention is that it provides products which not only exhibit high consistency but which are smoother (less granular) and which are less subject to syneresis than those prepared by known procedures. Moreover, by splitting the produce stream from a single production line or drawing products from two production lines, the operator can homogenize an appropriate proportion and then re-combine it with non-homogenized product to yield a composite product of improved consistency which has the texture and granular appearance of non-homogenized products but which is less subject to syneresis.

DETAILED DESCRIPTION OF THE INVENTION

The practice of the invention is further illustrated by the following detailed description.

1. Raw tomatoes, at their natural pH, are macerated and heated to inactivate the enzymes. The maceration is accomplished with enough mechanical action to reduce the tomatoes to a pulpy mass, but with minimum damage to individual fruit cells. Such results are readily attained by conventional maceration equipment commonly employed in the tomato industry.

The heating can be accomplished in various ways as well known in the art. One technique involves exposing whole tomatoes or pieces of tomatoes to steam or to a source of radiant energy such as infrared lamps or a microwave irradiation device. Preferably, the tomatoes are heated while concomitantly subjected to maceration. To achieve such an end, one may utilize the usual heating and macerating procedure as conventional in producing tomato juice by the hot-break system. Thus, raw tomatoes are fed into a vessel provided with steam coils (or steam jackets) and a rotating blade assembly for comminuting the tomatoes and agitating the material in the vessel so that good heat transfer will be obtained. By use of such equipment the raw tomatoes can be efficiently formed into a hot macerate which is ready for the next step. In cases where it is desired to achieve an especially rapid heating, one may employ a "drop-in" technique. This involves establishing a pool of tomato juice or tomato macerate (from a previous batch) in a vessel equipped with heating means and a rotor for comminuting and mixing the contents of the vessel. The pool of macerate or juice is maintained at about 200° F. and the tomatoes are fed into it at a predetermined rate. Because of the intimate contact with the hot juice, the entering tomato material is very rapidly brought up to an enzyme-inactivating temperature. The hot macerate produced in the vessel is withdrawn at a rate commensurate with the feed rate and this hot material is forwarded to the next step in the procedure. Various other examples of systems for effectuating the heating—or the concomitant heating and macerating—will be suggested to those skilled in the art from the above description. It is further obvious that regardless of the particular system used, the temperature and time of heating applied to the tomatoes should be sufficient to inactivate the enzymes. It is equally obvious that the program of heating should not be so drastic as to damage the tomato material.

2. The macerate from (Step 1), preferably while still hot, is mixed with an acid. In this mixing step mechanical shearing of individual fruit cells should be minimized. Thus, enough mechanical action to provide adequate mixing of the macerate with the acid should be applied, but excessive mixing must be avoided. In this way, increase in consistency is minimized.

Hydrochloric acid is preferred because it is effective, inexpensive, and particularly because eventual neutralization of the product (with sodium hydroxide) yields sodium chloride—a common additive in tomato products. The hydrochloric acid may be added as such or in the form of a gas. Moreover, acids other than hydrochloric can be employed as the primary consideration in the establishment of a low pH. Thus, for example, one may employ such strongly ionized acids as sulfuric, ortho-, meta-, and pyrophosphoric. Acids such as tartaric, citric, and acetic are too weakly ionized to be of any practical usefulness. In view of the above considerations, generally, one may employ any acid which has an ionization constant greater than $1 \times 10^{-3}$ and which is non-toxic. It is, of course, within the scope of the invention to use mixtures of two or more acids, for example, a mixture of hydrochloric and any of the phosphoric acids.

Generally, there is added an amount of acid sufficient to provide a pH below 3.5. Usually it is preferred to employ enough acid to provide a pH of about 1 to 3; a pH below 1 can be used but no practical advantage over the preferred pH range is attained.

In the preferred embodiment of the invention, the acid is incorporated with the hot macerate, and to cause the desired effect the mixture is allowed to stand while at about 150°–212° F. for a period of about 1 to 15 minutes. The effect desired is initiation of breakdown of the cellular walls (of the fruit cells suspended in the macerate) by release of pectinous material therefrom. It may be noted that the acid treatment—applied in accordance with the invention under conditions which cause minimum damage to fruit cells—does not cause any substantial increase in consistency; in fact, it often results in a thinning of the macerate.

3. After the macerate has been treated with acid as described above, the acidified macerate while still hot is passed through conventional equipment to extract the juice from the seeds, skins, bits of cores, and other debris. The apparatus used for the purpose may be, for example, a conventional pulper equipped with rotating paddles and fixed cylinders of woven wire or perforated metal construction. To avoid increase in consistency it is necessary to achieve this separation with minimum damage to fruit cells. This result can be attained by such expedients as regulating the force with which the macerate is applied to the pulping screens and by selection of screens with relatively large openings. For example, excellent results have been attained with the use of a first screen having openings one-eighth inch I.D. and a second (finisher) screen having openings of one-sixteenth inch I.D.

4. The juice, preferably after cooling to about room temperature, is neutralized to its normal pH (usually in the range 3.8 to 4.5) by incorporation of sodium hydroxide. Other alkaline agents such as sodium carbonate or bicarbonate may be used but are not preferred because of their foaming effect (caused by release of $CO_2$). In this step mechanical shearing of individual fruit cells should be minimized. Thus, enough mechanical action should be applied to provide adequate mixing of the juice with the neutralizing agent, but excessive shearing should be avoided whereby to minimize increase in consistency.

In an alternative embodiment of the invention, the same neutralization procedure as described above is employed but it is applied prior to juice extraction. Thus after the acid treatment (Step 2) has been completed, the macerate is neutralized to its normal pH and is then subjected to juice extraction (Step 3).

In another alternative embodiment of the invention, the neutralization step is deferred until after the homogenization step described below. In this instance it is not necessary to take any precautions to avoid shear stresses.

Hereinabove it has been emphasized that during the steps of maceration, acid treatment, juice extraction (pulping), and neutralization one must avoid the use of excessive shear whereby to minimize premature increase in consistency. It is also to be noted that in transfer of tomato material between these steps, the same precautions are to be observed. Such transfers are preferably accomplished by gravity flow and by the use of troughs or large-diameter conduits; the use of pumps and narrow piping should be avoided or at least minimized.

5. Next, the juice is subjected to homogenizing by applying vigorous and repeated shearing action. By such treatment the fruit cells suspended in the juice or concentrate are deliberately damaged—ruptured, shredded, sheared, or otherwise mechanically injured—with the end result that the material is increased in consistency. For carrying out the homogenization one can use various types of equipment. Among these are "Waring Blendors," "Osterizers," or the like—devices which provide a vessel with a rotating blade assembly in the base of the vessel. By rotating this blade at high speed the desired vigorous and repeated shearing action is attained. Another suitable type of equipment is a homogenizer (commonly used in creameries) which operates by forcing the juice under high pressure through a small orifice. Also useful are colloid mills which operate by subjecting the juice in a closely confined area to the action of the rapidly rotating multibladed rotor. Another type of equipment which may be used is a sonifier—a device which promotes cell disintegration by application of high-frequency sound waves. Other methods for accomplishing the homogenization operation will be evident to those skilled in the art from the foregoing examples. It is further obvious that the time and intensity of the homogenization will depend on such factors as the type of equipment selected, and the degree of consistency increase desired. In any particular case, trials may be run on pilot samples of juice, followed by measurements of the consistency of the products to select the conditions to be applied to the main batch.

Following the homogenization step, the juice may be further processed in conventional manner. For example, it may be canned as a single-strength juice or it may be first concentrated to a paste or puree and canned in such state. It may be used, in single strength or concentrated form, in the preparation of soups, sauces, ketchups, preserves, aspic products, etc. Also, it may be converted into solid dehydrated products by such known techniques as concentration followed by foam-mat drying or vacuum dehydration, or it may be spray dried. It is an important feature of the invention that the color, flavor, and nutrient value of the juice are not impaired so that it is suitable for all the uses for which conventional tomato juice is adapted.

Since the process of the invention produces a high-consistency juice, this product can be blended with conventional juices (ones of lower consistency) to provide a composite juice of intermediate consistency as may be required for a particular application. As an example of such procedure, a juice processing line may be operated for a first period of time in conventional manner and operated for a second period of time with application of the process of the invention, the two juices being then combined to yield the final product. By varying the relative duration of the first and second periods, products of a wide range of consistency can be produced.

Hereinabove the invention has been explained in connection with its use to prepare high-consistency juices. In its broad aspect, the invention can also be utilized for increasing the consistency of concentrated juice products such as purees, pastes, etc., such products being generically referred to herein as concentrates. In a practice of this phase of the invention, the juice prior to homogenation is subjected to concentration by conventional technique, for example, by simply boiling it or preferably by the use of low-pressure evaporation to avoid damage to its flavor and color. As with the other pre-homogenization steps, the concentration should preferably be accomplished under conditions to minimize mechanical shear whereby to increase consistency except, of course, that due to increase in solids content. In an alternative embodiment of the invention, the concentration is applied to the juice following the homogenizing step. In this instance, it is not necessary to take any precautions to avoid shear stresses.

It is recognized that it is generally known in the art that homogenization of liquid foods often yields an increase in consistency. However, the increase in consistency attained by homogenization alone is not comparable to that obtained in the process of the invention wherein acidification precedes homogenization. For example, the process of the invention readily yields increase in consistency of from 300% to 1,000% or more, whereas we have observed that homogenization alone applied to tomato juice or concentrates usually results in a thinning of the product or in rare cases the consistency is increased by a small degree, e.g., about 50–75%.

In the co-pending application of Robert Becker, Ser. No. 142,951, filed May 13, 1971, there is described a process for preparing high-consistency tomato products which includes several operations like those employed herein, including maceration and heating, acid treatment, and homogenization. Becker's process, however, differs from that of the invention in several respects. A primary item is that Becker first prepares a juice by conventional technique (i.e., maceration and heating of raw tomatoes followed by extraction of juice from the macerate) and then applies an acid treatment to the resulting juice. In the process herein, the acid treatment is applied not to the juice but to tomato macerate. As a result, the process of the invention provides an increased yield. That is, of the total tomato solids entered into the system, a greater proportion thereof is recovered in the end product. Another item is that there is no concept in the Becker patent of performing the acid treatment with minimum shear to avoid development of consistency at that stage.

EXAMPLES

The invention is further demonstrated by the following illustrative examples.

Some of the experiments described in the examples are not representative of the invention; they are included for purpose of comparison.

The measurements of consistency referred to in Examples 1, 2, and 3 were carried out as follows: The sample of liquid is de-aerated by subjecting it to a vacuum. Then, using an efflux tube consistometer, a measurement is made of the time required for 100 ml. of the liquid (at 25° C., 77° F.) to flow through the 3.3 mm. (I.D.) aperture of the instrument. With this test, a longer flow time reflects a higher consistency.

In the experiments reported in the examples (unless otherwise indicated), the maceration of the tomatoes and the homogenization of the juices were both carried out in a conventional blender—a device which includes a bowl and a rotating blade assembly in the base of the bowl for cutting and blending the material contained therein. For maceration purposes, the blade was operated at reduced speed to simply attain a comminution of the fruit to form a pulpy mass and with minimum damage to individual fruit cells. When the blender was used for homogenization, the blade was operated at high speed to attain vigorous and repeated shearing action, thus to cause cell disruption in addition to intimate mixing.

In the steps of acidification and neutralization, the necessary reagents were mixed into the tomato material with simple stirring to avoid excessive shear stresses on the fruit cells. Similarly, maceration and the juice extraction (pulping) were carried out with application of limited force to avoid excessive shear forces.

EXAMPLE 1

Hot-break tomato macerate was prepared in conventional manner:

Cleaned, raw tomatoes were broken in a screw-type crushing and chopping device and immediately pumped into a tank where the material was heated to about 200° F. by rotating steam coils within the tank.

Samples of the hot macerate were then treated as follows:

Sample A: Acidified with concentrated hydrochloric acid to pH 2.75, and held at 200° F. for 5 minutes.

Sample B: Not acidified; held at natural pH for 5 minutes at 200° F.

Macerate Samples A and B were then pulped while hot through a 0.033 inch screen, and the consistency of the resulting juices measured.

Juice Sample A was neutralized to its natural pH (4.45) with sodium hydroxide and its consistency was again measured.

Finally, juice Samples A and B were homogenized in a blender at high speed for 2 minutes; consistencies were determined.

The procedure described above was repeated with the only difference that the macerates with (Sample C) and without (Sample D) added acid were held for 10 minutes rather than for 5 minutes at said temperature of 200° F.

The results obtained are summarized below:

| Sample | Treatment of macerate | | | Consistency, sec. | | |
|---|---|---|---|---|---|---|
| | Acid | pH | Hold time, min. | After juicing | After neutralizing | After homogenizing |
| A | HCl | 2.75 | 5 | 91 | 80 | 331 |
| B | None | 4.45 | 5 | 60 | — | 47 |
| C | HCl | 2.75 | 10 | 103 | 109 | 349 |
| D | None | 4.45 | 10 | 102 | — | 71 |

EXAMPLE 2

Hot-break tomato macerate (prepared essentially as described in Example 1) was divided into two samples and treated as follows:

1. Sample A - Acidified to pH 2.85 with concentrated hydrochloric acid and held at 200° F. for 2.5 minutes.

Sample B - Not acidified; held at 200° F. for 2.5 minutes.

2. Macerate Samples A and B were pulped to obtain juice, which was cooled to ambient temperature.

3. Juice Sample A was treated with sodium hydroxide to restore the natural pH (4.37).

4. Juice Samples A and B were homogenized in a high-speed blender for 15 seconds, and the consistency of the juices was measured.

Mixtures of juice Sample A with juice Sample B were prepared, and their consistencies were measured. In addition, the appearance and texture of each mixture was noted. Syneresis of each mixture was determined as follows: Juice samples were mixed and allowed to stand at ambient temperature. Separation of the solid material from the liquid was observed. Those mixtures in which separation occurred after standing 10–15 minutes were classified as exhibiting severe syneresis; after 16–25 minutes, marked syneresis; and after 26 minutes, slight syneresis.

The results are summarized below:

| Juice Sample A (%) | Juice Sample B (%) | Consistency (sec.) | Appearance texture | Syneresis |
|---|---|---|---|---|
| 0 | 100 | 55 | Granular | Severe |
| 20 | 80 | 61 | Granular | Severe |
| 40 | 60 | 74 | Granular | Marked |
| 60 | 40 | 92 | Moderately granular | Slight |
| 80 | 20 | 112 | Slightly granular | Slight |
| 100 | 0 | 139 | Smooth | Slight |

We Claim:

1. A process for preparing tomato juice of increased consistency, which comprises a. macerating and heating tomatoes at their natural pH, the maceration being with force sufficient to break up the tomatoes into a pulpy mass but insufficient to cause substantial damage to individual fruit cells, the heating being at a temperature and for a time sufficient to inactivate the enzymes, but insufficient to damage the tomatoes, b. mixing the resulting tomato macerate with an amount of non-toxic acid sufficient to provide a pH less than 3.5, said mixing being sufficient to thoroughly distribute the acid within the macerate but insufficient to cause mechanical shearing of the individual fruit cells, whereby to avoid any substantial increase in consistency, c. extracting the juice from the macerate, said extraction being carried out under conditions which minimize mechanical shearing of individual fruit cells, whereby to avoid any substantial increase in consistency, and d. homogenizing the juice by applying vigorous and repeated shearing forces to the juice, whereby to cause extensive physical damage to the fruit cells in the juice and thereby increase its consistency.

2. The process of claim 1 wherein the raw tomatoes are first macerated and then subjected to the heating of (Step a).

3. The process of claim 1 wherein the raw tomatoes are macerated concomitantly with the heating of (Step a).

4. The process of claim 1 wherein the acid of (Step b) is hydrochloric in an amount to provide a pH about from 1 to 3.

5. The process of claim 1 wherein the acid treatment of Step b is carried out at a temperature of about from 150° to 212° F.

6. The process of claim 1 wherein the acid treatment of Step b is carried out for a period of about 1 to 15 minutes.

7. The process of claim 1 wherein the juice from Step c is restored to its natural pH by addition of a non-toxic alkaline material prior to the homogenizing of (Step d).

8. The process of claim 1 wherein the homogenized product of Step d is restored to its natural pH by incorporation of a non-toxic alkaline material.

9. A process for preparing tomato juice of increased consistency, which comprises
  a. macerating and heating tomatoes at their natural pH, the maceration being with application of force sufficient to break up the tomatoes into a pulpy mass but insufficient to cause substantial damage to individual fruit cells, the heating being at a temperature and for a time sufficient to inactivate the enzymes, but insufficient to damage the tomatoes,
  b. mixing the resulting hot tomato macerate with an amount of hydrochloric acid sufficient to provide a pH less than 3.5, said mixing being sufficient to thoroughly distribute the acid within the macerate but insufficient to cause mechanical shearing of individual fruit cells, whereby to avoid any substantial increase in consistency, then holding the resulting acidified macerate at about 150°–212° F. for about 1 to 15 minutes,
  c. extracting the juice from the hot acidified macerate under conditions which minimize mechanical shearing of individual fruit cells, whereby to avoid any substantial increase in consistency,
  d. neutralizing the resulting juice to its natural pH by addition of sodium hydroxide, and
  e. homogenizing the neutralized juice by applying vigorous and repeated shearing forces to the juice, whereby to cause extensive physical damage to the fruit cells in the juice and thereby increase its consistency.

10. A process for preparing tomato juice of increased consistency, which comprises
  a. macerating and heating tomatoes at their natural pH, the maceration being with application of force sufficient to break up the tomatoes into a pulpy mass but insufficient to cause substantial damage to individual fruit cells, the heating being at a temperature and for a time sufficient to inactivate the enzymes, but insufficient to damage the tomatoes,
  b. mixing the resulting hot tomato macerate with an amount of hydrochloric acid sufficient to provide a pH less than 3.5, said mixing being sufficient to thoroughly distribute the acid within the macerate but insufficient to cause mechanical shearing of individual fruit cells, whereby to avoid any substantial increase in consistency, then holding the resulting acidified macerate at about 150°–212° F. for about 1 to 15 minutes,
  c. mixing the resulting acid-treated macerate with an amount of sodium hydroxide sufficient to restore its natural pH, said mixing being under conditions which minimize mechanical shearing of individual fruit cells, whereby to avoid any substantial increase in consistency,
  d. extracting the juice from the neutralized macerate under conditions which minimize mechanical shearing of individual fruit cells, whereby to avoid any substantial increase in consistency, and
  e. homogenizing the resulting juice by applying vigorous and repeated shearing forces to the juice, whereby to cause extensive physical damage to the fruit cells in the juice and thereby increase its consistency.

11. A process for preparing tomato juice of increased consistency, which comprises
  a. macerating and heating tomatoes at their natural pH, the maceration being with application of force sufficient to break up the tomatoes into a pulpy mass but insufficient to cause substantial damage to individual fruit cells, the heating being at a temperature and for a time sufficient to inactivate the enzymes, but insufficient to damage the tomatoes,
  b. mixing the resulting hot tomato macerate with an amount of hydrochloric acid sufficient to provide a pH less than 3.5, said mixing being sufficient to thoroughly distribute the acid within the macerate but insufficient to cause mechanical shearing of individual fruit cells, whereby to avoid any substantial increase in consistency, then holding the resulting acidified macerate at about 150°–212° F. for about 1 to 15 minutes,
  c. extracting the juice from the hot acidified macerate under conditions which minimize mechanical shearing of individual fruit cells, whereby to avoid any substantial increase in consistency,
  d. homogenizing the resulting juice by applying vigorous and repeated shearing forces to the juice, whereby to cause extensive physical damage to the fruit cells in the juice and thereby increase its consistency, and
  e. neutralizing the homogenized product to its natural pH by addition of sodium hydroxide.

* * * * *